Oct. 5, 1965   G. BAECHLI   3,209,894
CONVEYOR
Original Filed May 11, 1959   2 Sheets-Sheet 1
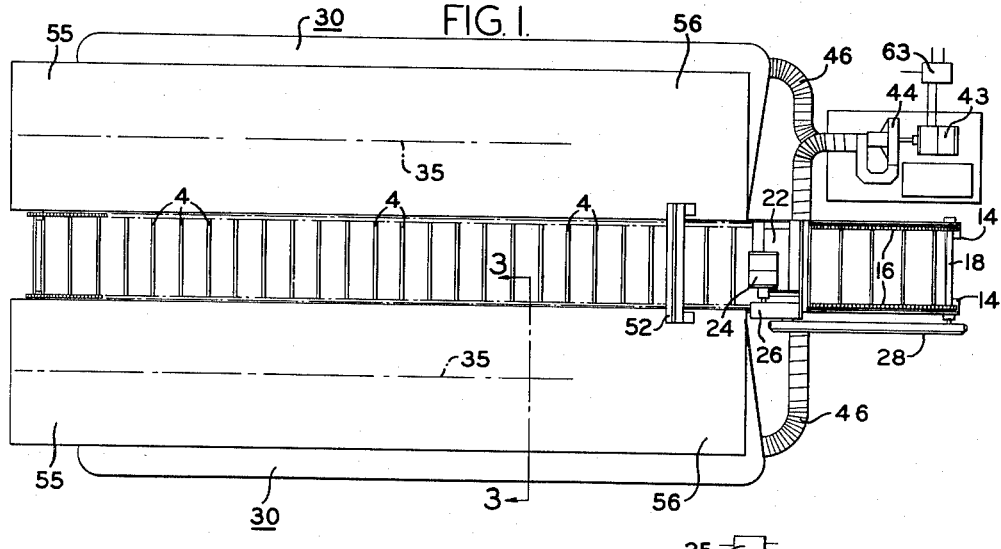
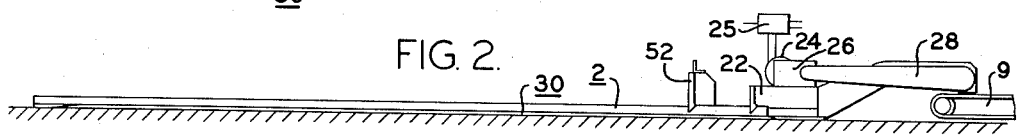
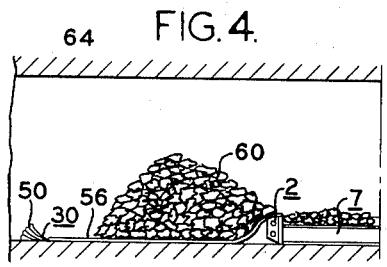
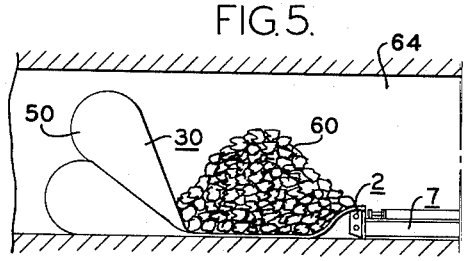
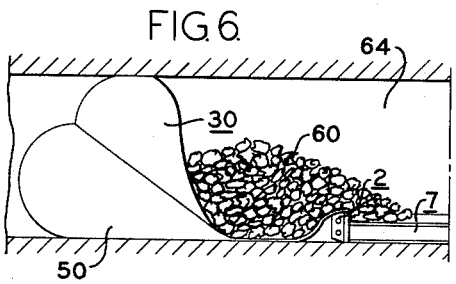
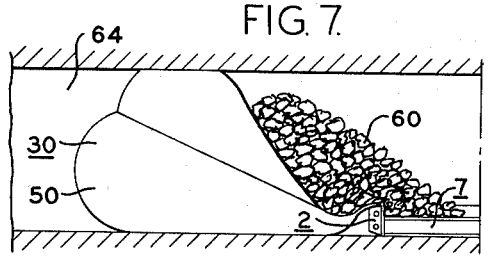
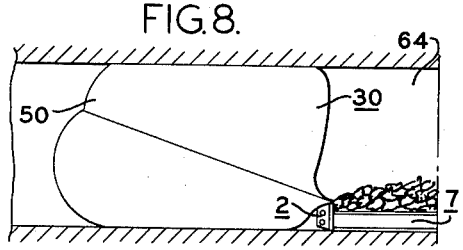
INVENTOR:
GEORGE BAECHLI
BY
E. Wallace Breen
ATTORNEY Oct. 5, 1965     G. BAECHLI     3,209,894
CONVEYOR
Original Filed May 11, 1959     2 Sheets-Sheet 2
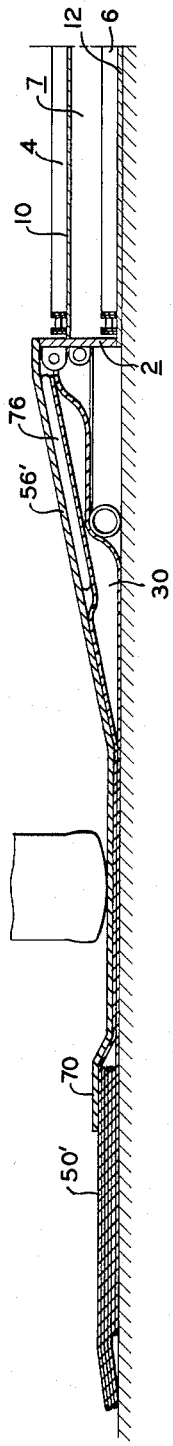
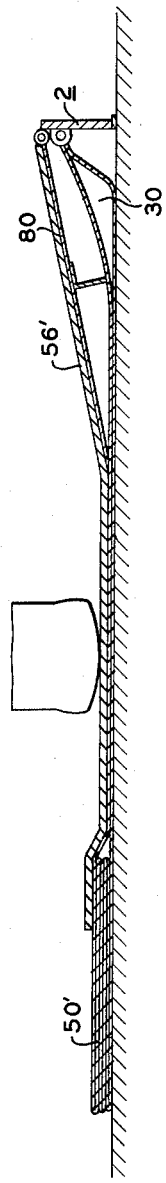
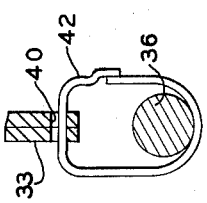
INVENTOR:
GEORGE BAECHLI
BY
ATTORNEY United States Patent Office 3,209,894
Patented Oct. 5, 1965

3,209,894
CONVEYOR
George Baechli, New Philadelphia, Ohio, assignor to Joy Manufacturing Company, Pittsburgh, Pa., a corporation of Pennsylvania
Continuation of application Ser. No. 812,189, May 11, 1959. This application June 24, 1964, Ser. No. 379,434
5 Claims. (Cl. 198—52)

This application is a continuation of U.S. patent application 812,189, filed May 11, 1959, now abandoned, entitled "Conveyor."

This invention relates to a conveyor and more particularly to a conveyor which is capable of receiving a large amount of material and continuously discharging portions of such material at a fairly constant rate.

At the present time manufacturers of mining machinery have produced machines which are capable of mining and transporting substantially greater quantities of a mineral than as heretofore been possible with prior machines. Such increased quantities of mined material have necessitated increasing the capacity of the belt conveyors which are provided for transporting the mined material away. Unfortunately such large belt conveyors are considerably more expensive and in many instances are not fully loaded at all times due to the fact that the mined material is intermittently fed to the conveyor. Consequently by providing a continuous feed to a belt conveyor the same quantity of material is conveyed as is conveyed by a larger belt conveyor which is intermittently fed.

Accordingly one object of this invention is to provide a new and improved conveyor which is capable of receiving a large quantity of material and discharging smaller quantities of such material at a fairly uniform rate.

Another object of this invention is to provide a new conveyor comprising a member upon which material is dumped and which is inflatable to feed the material to another conveyor.

Still another object of this invention is to provide a new and improved conveyor comprising a member upon which material is dumped and inflatable to feed the material to another conveyor and which member is constructed so that its side remote from the other conveyor is inflated first.

A more specific object of this invention is to provide a new and improved conveyor comprising a pair of members which are located on opposite sides of an orbitally movable conveyor and which members are inflatable to feed material to the orbitally movable conveyor.

These and other objects of this invention will become more apparent when taken in conjunction with the following detailed description of preferred embodiments thereof and the following drawings, in which:

FIG. 1 is a top plan view of a conveyor constructed in accordance with the principles of this invention, FIG. 2 is a side elevational view of the conveyor as shown in FIG. 1, FIG. 3 is an end elevational view of the conveyor as shown in FIG. 1 taken substantially along the line 3—3 thereof, FIG. 4 is an end elevational view of a portion of the conveying apparatus similar to that shown in FIG. 1 with a pile of material thereon prior to the inflation of the expandable member thereof, FIGS. 5, 6, 7 and 8 are end elevational views similar to that of FIG. 4 with the expandable member being further inflated, respectively, FIG. 9 is an enlarged cross sectional view of a conveyor clip as employed in the conveyor shown in FIG. 1, FIG. 10 is a cross sectional view similar to FIG. 3 of another embodiment of this invention, and FIG. 11 is a cross sectional view similar to FIG. 3 of still another embodiment of this invention.

Referring to FIGS. 1, 2 and 3, a conveyor constructed in accordance with the principles of this invention comprises an elongated frame 2 which supports the upper conveying run 4 and the lower return run 6 of an endless orbitally movable flight conveyor 7. For the purpose of this invention the runs 4 and 6 may be supported and driven in any suitable manner and, as shown, the frame 2 comprises a pair of elongated side supports 8 which are suitably rigidly joined together by a pair of horizontally extending plates 10 and 12 which extend laterally and longitudinally therebetween. The plate 12 rests upon the ground surface over which the material is conveyed and its upper surface provides a guide for the return run 6 while the plate 10 is located above the plate 12 and has an upper surface upon which the material to be conveyed is dumped and moved thereacross by the orbital movement of the flight conveyor 7. In order to discharge conveyed material from the flight conveyor 7 to a main haulage conveyor 9 the entire frame 2 is elevated at its discharge end to permit the inbye end of the conveyor 9 to be located therebelow. The main haulage conveyor 9 may be of any suitable type and may extend at any desired operable angle with respect to the discharge end of the conveyor 7. In many mining operations the height in which the conveyor of this invention is adapted to operate is severely limited so that the height of the main haulage conveyor 9 above the ground varies. Accordingly, the elevated discharge end of the frame 2 is pivotally secured to ground engaging portion of the frame 2 to permit the discharge height of the conveyor 7 to be varied. Also, the discharge end of the frame 2 is provided with downwardly and inwardly tilted guide surfaces 14 to centrally deposit the material conveyed by the conveyor 7 onto the main haulage conveyor 9.

As is known, the conveyor 7 is provided with an orbital chain element 16 inwardly adjacent each side of the side supports 8 which engage sprockets on a suitably supported rotatable shaft 18 at the discharge end of the frame 2. The chain elements 16 are similarly supported at the receiving end of the frame 2 and at as many intermediate locations longitudinally of the frame as are desired. A suitable, generally inverted, U-shaped support is rigidly secured to the ground engaging portion of the frame 2 adjacent the discharge end thereof so as to provide a platform 22 located above the conveyor 7. A suitable electrical motor 24 is suitably supported on the platform 22 which drives a suitable speed reducer 26, which is also supported on the platform 22, and which speed reducer 26 is connected by a suitable drive chain 28 to a driving sprocket secured to the adjacent outer end of the shaft 18 whereby the conveyor 7 is suitably driven through an orbital path. Although the motor 24 and the speed reducer 26 are preferably located as described in order to conserve space it will be obvious that their location may be varied as desired.

The motor 24 is also provided with suitable electrical controls 25 which are connected to the controls for the main haulage conveyor (not shown) so that movement of the conveyor 7 will only occur when the main haulage conveyor 9 is moving in order to prevent material from being discharged onto the main haulage conveyor 9 during the period the main haulage conveyor 9 is stationary.

Adjacent each side of the ground engaging portion of the frame 2 there is provided an elongated inflatable member 30 which is in the nature of a bag or container and is formed from any suitable material whereby its volume may be substantially increased upon inflation. For the purpose of this invention the members 30 need only be inflatable and not resilient; accordingly, the members 30 are formed from a suitable inflatable material such as a nylon cross weave fabric having a light coating of neoprene. In order to freely secure the members 30 to the frame 2 to permit the members 30 to be inflated each side support 8 is provided with a plurality of longitudinally spaced outwardly extending supporting lugs 32 each of which on each side of the frame 2 has longitudinally aligned openings 34 therein for supporting an elongated rod 36 outwardly adjacent the upper edge of the support 8. For the purpose of this invention the rods 36 may be either freely or rigidly supported by the lugs 32 and as shown are rigidly secured to the lugs 32 by suitable means such as welds 38. Each of the members 30 (see FIG. 9) is provided with a lip portion 33 extending longitudinally thereof in which a plurality of longitudinally spaced openings 40 are located. The openings 40 in the members 30 are located outwardly adjacent the supports 8 whereby each member 30 is secured to the rod 36 adjacent thereto by means of suitable elongated spring latches 42 which extend through the openings 40, respectively, and are snapped around the rods 36.

Inflation of the members 30 is accomplished by means of a fan or blower 44 located adjacent the discharge end of the conveyor 7 on a suitable ground engaging support. The outlet side of the blower 44 is connected by suitable non-collapsible flexible tubing 46 to each of the members 30 adjacent the discharge end of the conveyor 7. If desired, a rigid tube may be employed from the outlet side of the blower 44 and a flexible coupling provided between the members 30 and the rigid tube to compensate for the swelling of the members 30 during their inflation. The blower 44 is driven in a suitable manner such as an electric motor 43 whereby the inflation of the members 30 may be easily controlled. As shown, the members 30 are initially deflated and lie flat over the ground surface of each side of the conveyor 7 and are, when collapsed, of a generally rectangular form.

With the structure as heretofore described a large quantity of loose material may quickly be dumped onto the flat surface of the members 30 throughout the lengths thereof and over the conveyor 7 in an elongated pile. With material being so dumped, orbital movement of the conveyor 7 will cause the central portion of the pile to be moved by the conveyor 7 over its discharge end onto the material haulage conveyor 9. Such conveying will continue until the central portion of the dumped pile will be completely exhausted at which time a smaller pile of material will be provided on each of the members 30 adjacent each side of the conveyor 7 and which smaller piles extend the length of the members 30 (see FIG. 4.) In order to feed such side piles onto the conveyor 7 the blower 44 is started to start to inflate the members 30 and the members 30 start to rise upwardly so that the material thereon flows gravitationally towards the running conveyor 7. It will be realized that as a member 30 is inflated material would normally tend to run from each side of the member. Accordingly (see FIG. 3), the outer edges of the members 30 spaced outwardly from the conveyor 7 comprise overlapping folded portions 50 of the members 30 are initially inflated to provide a side along the outer edge of the members 30 whereby the pile material is located between the bulging outer sides of the members 30. As the members 30 are further inflated the material piled thereon is gradually fed gravitationally into the conveyor 7. With the inflatable members 30, as heretofore described, it has been found advantageous to have the conveyor 7 run continuously so that as the material is dumped thereon it is continuously being discharged onto the material haulage conveyor 9 whereby the time required for moving material from the complete conveyor of this invention to the conveyor 9 is decreased.

In mining, as is presently known, it is common practice to use large elongated shuttle cars which are steerable and movable over the ground surface in the mine and which have central conveyors whereby the material being transported by the shuttle cars is rapidly dischargeable from one end of the shuttle car. Accordingly, with the conveyor of this invention the shuttle car is driven onto the members 30 so that its wheels span the conveyor 7 along the longitudinal center lines 35 (see FIG. 1) of members 56 hereinafter described. The shuttle car is then reversed and continuously discharges its load onto the conveyor of this invention during such withdrawal so that the material is deposited along the length of the conveyor 7 and the members 30. In view of the fact that such shuttle cars are normally employed it is advantageous to secure a suitably rigid upwardly extending support 52 to the ground engaging portion of the frame 2 adjacent its discharge end which is engageable with the end of the shuttle car to prevent the shuttle car from running into the discharge end of the conveyor 7 or the motor 24. The support 52 may be of any suitable form to engage such a shuttle car and which does not interfere with the operation of the conveyor 7.

As will be appreciated, the running of the wheels of a shuttle car over the outer surface of the members 30 causes the members 30 to be forced into the ground. In view of the fact that the ground in mines is generally quite uneven and the shuttle car wheel weight is quite large such continual movement causes the members 30 to be severely abraded. Accordingly, in the preferred embodiment of this invention, shown in FIGS. 1–8, protecting members 56 are provided which cover the upper and lower surfaces of the members 30 and which members 56 extend forwardly from the members 30 to provide a runway portion 55 for the wheels of a shuttle car. As shown, the members 30 are spaced inwardly of the runway portions 55, although, if desired, the runway portions 55 may be located outwardly beyond the conveyor 7. A factor of great importance from a practical standpoint is the fact that the protective members 56 are preferably formed from a neoprene belting which is a scrap item in most mines and is available in any practical length. In use a pair of suitable lengths of scrap belting are placed below and above each of the members 30 and are secured together at the side adjacent the frame 2 and each of their ends in any suitable well known manner. In addition the sides of the joined belt forming the members 56 are suitably freely secured to the rods 36 such as in a manner similar to that in which the members 30 are secured thereto.

FIGS. 4–8 illustrate the operation of a conveyor of this invention having protective members 56 in a low height coal seam 64 and upon which mined coal is dumped. FIG. 4 illustrates the side piles 60 of material that are left on the upper members 56 after the conveyor 7 has initially conveyed away the central portion of the dumped pile of material. At that time (see FIG. 5) the members 30 are simultaneously started to be inflated. In view of the fact that the folded portions 50 of the members 30 are located outwardly from the piles 60 and the air is admitted into the folded portions 50 through ducts 46 to initially inflate the folded portions 50, the folded portions 50 bulge upwardly towards the roof of the mine passageway 64 and the piles 60 are located between such bulged folded portions 50 and the side of the frame 2 of conveyor 7. Further inflation of the members 30 causes the folded portions 50 (see FIG. 6) to expand into engagement with the roof of the passageway 64 and laterally towards the conveyor 7. Still further inflation of the members 30 causes the entire width of the members 30 to expand until all of the material on the piles 60 is forced into the conveyor 7 (see FIG. 8).

The operating cycle of the conveyor of this invention is as has been previously described. In addition, a control 63 for the motor 43 is provided for the shuttle car operator so that as the shuttle car leaves the runway 55 the blower 44 is started. The blower 44 operates for a fixed period of time which is determined by the encountered operating conditions so that the members 30 are fully inflated. The blower 44 is then automatically turned off so that the expanded members 30, as they start to collapse, increase the air pressure therein and start, after a delay, to drive the blower 44 backward. After the desired time lapse the blower 44 is driven backwards by the motor 43 so that the members 30 are completely exhausted and collapse to their starting position so as to be ready for their next load. Thus the apparatus of this invention provides for a rapid intermediate conveyor for feeding a main conveyor which intermediate conveyor cycles so as to be ready for its next load. Although a mining operation has been described it will be obvious that the principles of this invention are adapted for conveying any material to a central conveyor.

FIGS. 10 and 11 illustrate other embodiments of this invention in which like parts have been identified by the same reference numeral. In FIG. 10 it will be noted that the previously described structure has been modified in that only an upper protective member 56' is provided which is formed at its outer edge to provide a lip 70 over flat folded portions 50'. The formed member 56 is inclined adjacent the frame 2 to which the tubing is connected. If desired, metallic rods or channels 76 may be secured to the underside of the inclined portion to brace the member 56' adjacent the frame 2. In FIG. 11 the formed member 56' is employed with a metallic plate 80 being provided adjacent the frame 2 and below the inclined portion of the member 56' which is pivoted to the frame 2 to provide a rigid slide, when the members 30 are inflated, to guide the material on the members 30 into the conveyor 7.

Having described preferred embodiments of this invention in accordance with the patent statutes, it is to be realized that modifications thereof may be made without departing from the broad spirit and scope of this invention. Accordingly, it is respectfully requested that this invention be interpreted as broadly as possible and be limited only by the prior art.

I claim:

1. A conveyor consisting of an inflatable bag having a first elongated flexible generally flat portion supportable on a supporting surface and having a pair of end portions; a second elongated flexible generally flat portion overlying and abuttingly engageable with said first portion when said inflatable bag is deflated and having a pair of end portions connected to the end portions, respectively, of said first flat portion; said flat portions having fixed longitudinal edges, respectively, disposed along an elongated axis; said bag being externally constrained against movement upon inflation thereof only by said surface and said fixed longitudinal edges; said flat portions having other longitudinal edges, respectively, spaced laterally from said fixed longitudinal edges; a plurality of overlapping folded pliable portions connecting said other longitudinal edges of said flat portions, respectively; said folded portions extending laterally outwardly from said other longitudinal edges and supported only by said other edges and said supporting surface; and means connected to said overlapping folded pliable portions for inflating and deflating said bag.

2. A conveyor device comprising: an elongated conveyor supported on a ground surface, at least one inflatable bag disposed on said surface adjacent at least one side of said elongated conveyor for delivering material to said elongated conveyor; said bag having a first elongated flexible generally flat portion supportable on said surface and having a pair of end portions; a second elongated flexible generally flat portion overlying and abuttingly engageable with said first portion when said inflatable bag is deflated and having a pair of end portions connected to the end portions, respectively, of said first flat portion; said flat portions having fixed longitudinal edges, respectively, connected to said one side of said elongated conveyor; said bag being externally constrained against movement upon inflation thereof only by said surface and said fixed longitudinal edges; said flat portions having other longitudinal edges, respectively, spaced laterally from said fixed longitudinal edges; a plurality of overlapping folded pliable portions connecting said other longitudinal edges of said flat portions, respectively; said folded portions extending laterally outwardly from said other longitudinal edges and supported only by said other edges and said ground surface, and means connected to said overlapping folded pliable portions for inflating and deflating said bag.

3. A conveyor for use in an underground passageway having spaced upper and lower surfaces; said conveyor consisting of an inflatable bag having a first elongated flexible generally flat portion supportable on said lower surface and having a pair of end portions; a second elongated flexible generally flat portion having a first surface overlying and abuttingly engageable with said first portion when said inflatable bag is deflated and a second surface engageable with said upper surface when said bag is inflated; said second flat portion having a pair of end portions connected to the end portions, respectively, of said first flat portion; said flat portions having fixed longitudinal edges, respectively, disposed along an elongated axis; said flat portions having other longitudinal edges, respectively, spaced laterally from said fixed longitudinal edges; a plurality of overlapping folded pliable portions connecting said other longitudinal edges of said flat portions, respectively; said folded portions extending laterally outwardly from said other longitudinal edges and supported only by said other edges and said lower surface of said passageway; and means connected to said overlapping folded pliable portions for inflating and deflating said bag.

4. A conveyor device for use in a underground passageway having spaced upper and lower surfaces, said conveyor device consisting of an elongated conveyor supported on said lower surface; at least one inflatable bag disposed on said lower surface adjacent at least one side of said elongated conveyor for delivering material to said elongated conveyor; said bag having a first elongated flexible generally flat portion supportable on said lower surface and having a pair of end portions; a second elongated flexible generally flat portion having a first surface overlying and abuttingly engageable with said first portion when said inflatable bag is deflated and a second surface engageable with said upper surface when said bag is inflated; said second flat portion having a pair of end portions connected to the end portions, respectively, of said first flat portion; said flat portions having fixed longitudinal edges, respectively, connected to said one side of said elongated conveyor; said flat portions having other longitudinal edges, respectively, spaced laterally from said fixed longitudinal edges; a plurality of overlapping folded pliable portions connecting said other longitudinal edges of said flat portions, respectively; said folded portions extending laterally outwardly from said other longitudinal edges and supported only by said other edges and said lower surface of said passageway; and means connected to said overlapping folded pliable portions for inflating and deflating said bag.

5. A method of enabling the rapid unloading of flowable aggregate material from a mobile haulage vehicle comprising, locating a mobile haulage vehicle to overlie a generally horizontally extending conveyor having a feeder portion adjacent a conveyor portion with said feeder portion comprising when deflated a generally flat inflatable bag supported on a ground surface and being inflatable to cause a portion thereof to rise above said ground surface and discharge material deposited thereon onto said conveyor portion, depositing such material from said vehicle in a pile onto said portions of said conveyor, removing said vehicle from said conveyor, inflating said feeder portion, and conveying away said deposited material by said conveyor portion.

References Cited by the Examiner
UNITED STATES PATENTS

| | | | |
|---|---|---|---|
| 2,105,160 | 1/38 | Piquerez | 222—386.5 |
| 2,829,803 | 4/58 | Paton | 222—95 |

SAMUEL F. COLEMAN, *Primary Examiner.*